United States Patent
Ohara et al.

(10) Patent No.: US 6,444,346 B1
(45) Date of Patent: Sep. 3, 2002

(54) FUEL CELLS STACK

(75) Inventors: Hideo Ohara, Katano; Makoto Uchida, Hirakata; Yasushi Sugawara, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/353,637

(22) Filed: Jul. 15, 1999

(30) Foreign Application Priority Data

Jul. 21, 1998 (JP) .......................... 10-204654

(51) Int. Cl.[7] .......................... H01M 2/08; H01M 8/02; H01M 8/04
(52) U.S. Cl. .......................... 429/36; 429/32; 429/44; 429/39; 429/30; 429/34; 429/35
(58) Field of Search .............. 429/32, 36, 44, 429/39, 30, 34, 35

(56) References Cited

U.S. PATENT DOCUMENTS

| | | | |
|---|---|---|---|
| 5,300,370 A | * | 4/1994 | Washington et al. .......... 429/32 |
| 5,432,023 A | * | 7/1995 | Yamada et al. ................ 429/39 |
| 5,643,690 A | * | 7/1997 | Tateishi et al. ............... 429/44 |

FOREIGN PATENT DOCUMENTS

| | | |
|---|---|---|
| JP | 6196177 | 7/1994 |
| JP | 6223836 | 8/1994 |
| JP | 8045517 | 2/1996 |
| JP | 8130023 | 5/1996 |
| JP | 8203543 | 8/1996 |
| JP | 8222237 | 8/1996 |

* cited by examiner

*Primary Examiner*—Mark F. Huff
*Assistant Examiner*—Deborah Chacko-Davis
(74) *Attorney, Agent, or Firm*—Stevens, Davis, Miller & Mosher, LLP

(57) ABSTRACT

In a polymer electrolyte membrane type fuel cell employing a high polymer ion exchange membrane as an electrolyte, a fuel cells stack is produced at a low cost by easily constituting flow passages for a fuel gas, an oxidizing agent gas and a cooling water which have been conventionally constituted by a cutting process being hard to process and hard to reduce a cost. The fuel gas passage, the oxidizing agent gas flow passage and the cooling water flow passage are constructed by a combination of a diffuser constituted by a conductive porous body or a corrugated plate and an elastic gasket, whereby a cutting process is not required, and a number of parts can be reduced and an operating performance can be improved by integrally forming the gasket with the separator, so that a cost can be reduced.

20 Claims, 7 Drawing Sheets

FUEL CELLS STACK

BACKGROUND OF THE INVENTION

1. Field of the Invention

The present invention relates to a fuel cells stack which uses a polymer electrolyte membrane type fuel cell employing a hydrogen as a fuel and employing an air as an oxidizing agent.

2. Description of the Prior Art

A polymer electrolyte membrane type fuel cell uses an ion exchange membrane corresponding to a fixed polymer electrolyte for an electrolyte, a generally schematic view thereof is shown in FIG. 6. In this structure using the ion exchange membrane 20, a fuel cell 23 corresponding to a unit battery is constituted by forming a positive pole 21 and a negative pole 22 in a layered shape on both surfaces of the ion exchange membrane 20 and combining them. In the case of employing a hydrogen as a fuel, in the negative pole, the following reaction is affected on a contact interface between the catalyst and the polymer electrolyte.

$$H_2 \rightarrow 2H^+ + 2e^-$$

Further, in the case of employing an oxygen as the oxidizing agent, in the positive pole, the following reaction is affected, so that a water is produced.

$$1/2 O_2 + 2H^+ 2e^- \rightarrow H_2O$$

The catalyst corresponds to an activating point for the reaction, the electrode layer corresponds to a transmitting body for an electron in the reaction, and the polymer electrolyte corresponds to a transmitting body for a hydrogen ion. The fuel cell 23 is structured as shown in FIG. 7 such that a fuel gas flow passage is formed on one side surface and an oxidizing agent gas flow passage is formed on the other side surface, and a lamination of each of the fuel cells is performed by being connected in series with using a separator plate 24 having the fuel gas flow passage and the oxidizing agent gas flow passage for supplying the fuel gas and the oxidizing agent gas and the cooling water flow passage for cooling the fuel cells stack, and a gasket 25, forming a laminated body 26 as shown in FIG. 8 so as to form a fuel cells stack and fastening by an end plate 27, thereby forming one power generating unit.

The fuel cells itself constituted in this manner becomes a heat generating source since an energy corresponding to an excessive voltage in correspondence to a current density caused by a power generation at a time of generating a power. Accordingly, in order to keep a temperature for operating the fuel cells to an optimum state, it is necessary to introduce the cooling water to the fuel cells stack so as to remove a generated energy.

In order to secure the gas flow passages and constructing the flow passage for the cooling water, the flow passages for the fuel gas, the oxidizing agent gas and the cooling water are made of a material which is excellent in conductivity, the separator for sealing and separating the respective fluids from each other and the gasket are required for the structure of the fuel cells stack, and a high density carbon or the like is employed for the material of the separator.

In the structure of the conventional fuel cells stack mentioned above, the fuel gas flow passage, the oxidizing agent gas flow passage and the cooling water flow passage are formed by cutting the high density carbon separator. However, since the gas flow passage is complex and it is complex and hard to construct the gas flow passage by cutting the high density carbon, this prevents a cost reduction.

Further, in the fuel cells stack mentioned above, since a plurality of separators, gaskets and fuel cells cells are laminated and constructed, a large number of parts which are necessary in an assembling process of the fuel cells stack is required, a positioning is hard due to a large number of parts, and much labor and time is required, so that this prevent a cost reduction.

As a method of solving the problems mentioned above, there has been disclosed a technique for reducing a cost for processing the separator such as the structure of employing a metal material forming a projection for the separator (Japanese Patent Unexamined Publication No. 8-222237), the structure of the gas flow passage using a porous plate or a corrugated plate (Japanese Patent Unexamined Publication Nos. 8-130023, 6-223836, 6-196177 and 8-203543) and the like.

Further, there has been a technique for reducing a number of the parts such as the structure of integrating the electrode with the gasket (Japanese Patent Unexamined Publication No. 8-45517), the structure of adhering and integrating the gasket with the metal separator (Japanese Patent Unexamined Publication No. 6-196177) and the like.

However, in the conventional techniques mentioned above, it is not possible to sufficiently secure the same gas flow passage as that in the case of processing the high density carbon separator, and further, there is not shown a method of easily constructing the flow passages and reducing the number of the parts.

SUMMARY OF THE INVENTION

An object of the present invention is to provide a fuel cells stack which solves the conventional problems mentioned above, constructs a flow passage easily securing a sufficient gas flow passage as well as reducing a number of parts and can reduce a cost.

In order to solve the problems mentioned above, in accordance with the present invention, there is provided a fuel cells stack comprising a plurality of fuel cells each arranging an electrode on both side of a solid electrolyte, separators each constituted by a gas impermeable and dense plate having a conductivity and gaskets laminated to form a plurality of layers, a fuel gas flow passage for supplying a fuel gas to the fuel cell provided on one side surface of the fuel cell, and an oxidizing agent gas flow passage for supplying an oxidizing agent gas to the fuel cell provided on the other side surface, wherein any one of the fuel gas flow passage, the oxidizing agent gas flow passage or a cooling water flow passage used for cooling the fuel cell is provided on the side surface of at least one of the fuel cell and the laminated separator, and the fuel gas flow passage, the oxidizing agent gas flow passage and the cooling water flow passage provided in the separator are constituted by a combination of the gasket integrally formed with the separator and a diffuser formed by a porous body or a corrugated plate made of a material having a conductivity, whereby it is possible to reduce a number of parts and reduce a processing cost of the separator by integrating the separator, various kinds of flow passages and the gasket.

The fuel cells stack in accordance with the present invention is structured such that any one of the fuel gas flow passage, the oxidizing agent gas flow passage or a cooling water flow passage used for cooling the fuel cell is provided on the side surface of at least one of the fuel cell and the laminated separator, and the fuel gas flow passage, the oxidizing agent gas flow passage and the cooling water flow passage provided in the separator are constituted by a combination of the gasket integrally formed with the separator made of a gas impermeable and dense plate having a conductivity and a diffuser formed by a porous body or a corrugated plate made of a material having a conductivity.

The present invention is constructed by simultaneously integrally molding various kinds of flow passages to be formed together with the gasket on the gas impermeable and dense plate having a conductivity corresponding to the separator. However, it is hard to construct the complex various kinds of flow passages only by the gasket. Accordingly, a rough flow passage is constructed at the same time of a construction of the gasket, and a complex flow passage is constructed by combining the diffuser constituted by a porous body made of a material having a conductivity or a corrugated plate in order to supplement this. It is possible to easily construct various kinds of flow passages by attaching the gasket and the porous body made of the material having a conductivity or the corrugated plate to the separator so as to integrally mold. Further, since the structure is integrally molded, a number of the parts is reduced, a positioning can be easily performed in the case of laminating and constructing a stack, a labor and time is reduced, and a cost can be reduced.

DESCRIPTION OF THE PREFERRED EMBODIMENT

Hereinafter, an embodiment in accordance with the present invention will be in detail described below with reference to the accompanying drawings.

Figure 1:
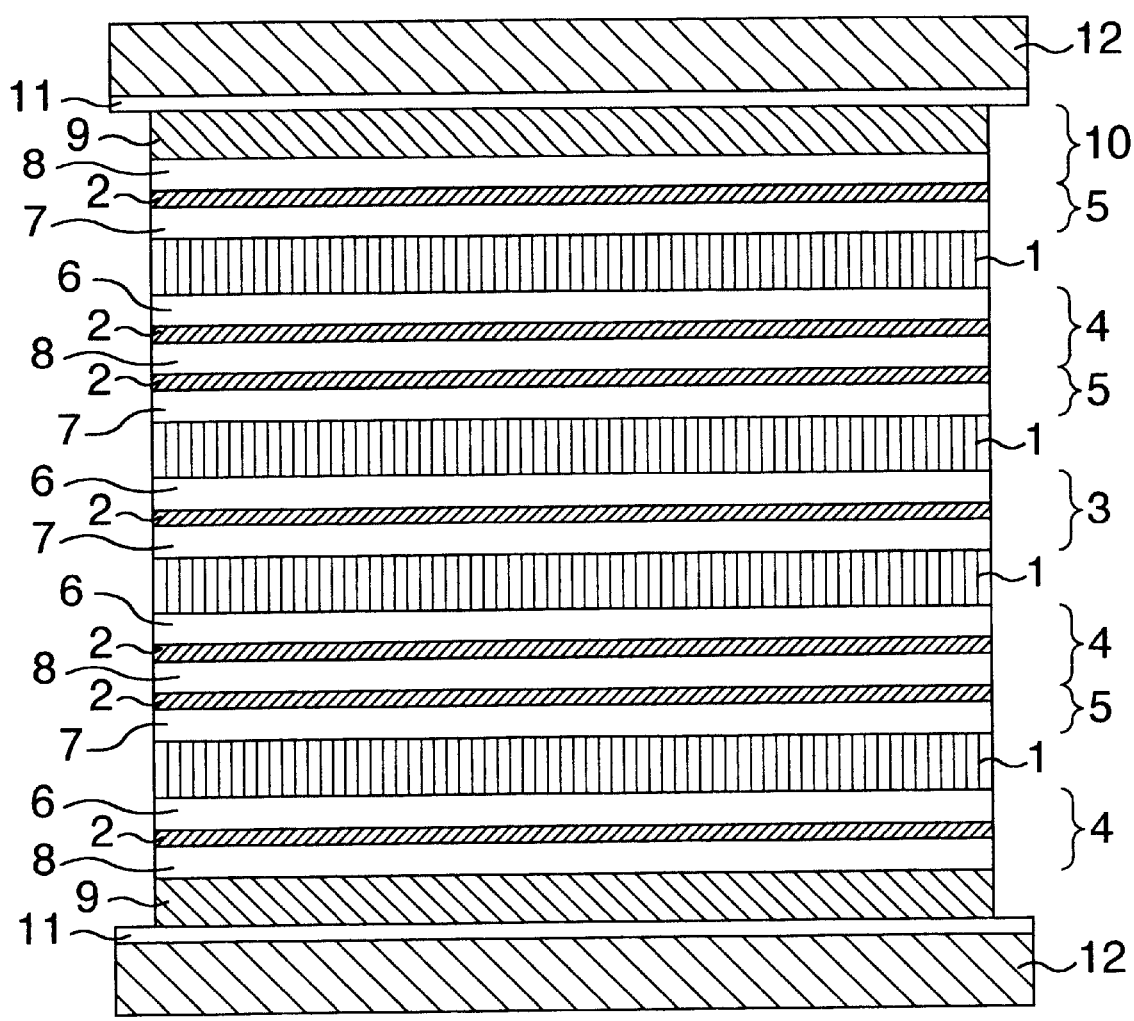
FIG. 1 is a schematic view of a fuel cells stack in an embodiment in accordance with the present invention.

FIG. 1 is a schematic view which shows a structure of a fuel cells stack in accordance with the present embodiment. In FIG. 1, reference numeral 1 denotes a fuel cell generating a power by a hydrogen and an air, which is structured such that a positive pole and a negative pole are formed on both surface of an ion exchange membrane in a laminating manner. Reference numeral 3 denotes a separator A obtained by integrally molding a fuel gas flow passage 6 on one surface of a separator 2 and an oxidizing agent gas flow passage 7 on the other surface thereof. Reference numeral 4 denotes a separator B obtained by integrally molding the fuel gas flow passage 6 on one surface of the separator 2 and a cooling water flow passage 8 on the other surface thereof. Reference numeral 5 denotes a separator C obtained by integrally molding the oxidizing agent gas flow passage 7 on one surface of the separator. Reference numeral 9 denotes a current collecting plate and reference numeral 10 denotes a current collecting plate A obtained by integrally molding the cooling water flow passage 8 with the current collecting plate 9. These parts are arranged in such a manner that the fuel gas flow passage 6 and the oxidizing agent gas flow passage 7 are respectively arranged in both sides of the fuel cell, and the cooling water flow passages 8 are arranged at a number necessary for cooling the fuel cell. In the structure shown in FIG. 1, a lamination is performed in the order of the current collector A10—the separator C5—the fuel cell 1—the separator B4—the separator C5—the fuel cell 1—the separator A3—the fuel cell 1—the separator B4—the separator C5—the fuel cell 1—the separator B4—the current collector 8, and the structure of the fuel cells unit is made such as to arrange an insulating plate 11 on both of the current collectors and to be fastened by an end plate 12 having a manifold for supplying a fuel gas, an oxidizing agent gas and a cooling water to the fuel cell and the cooling water flow passage 7.

FIGS. 2, 3, 4, and 5 respectively show structures of the separators A, B and C and the current collecting plate A used in the present embodiment.

Figure 2A:
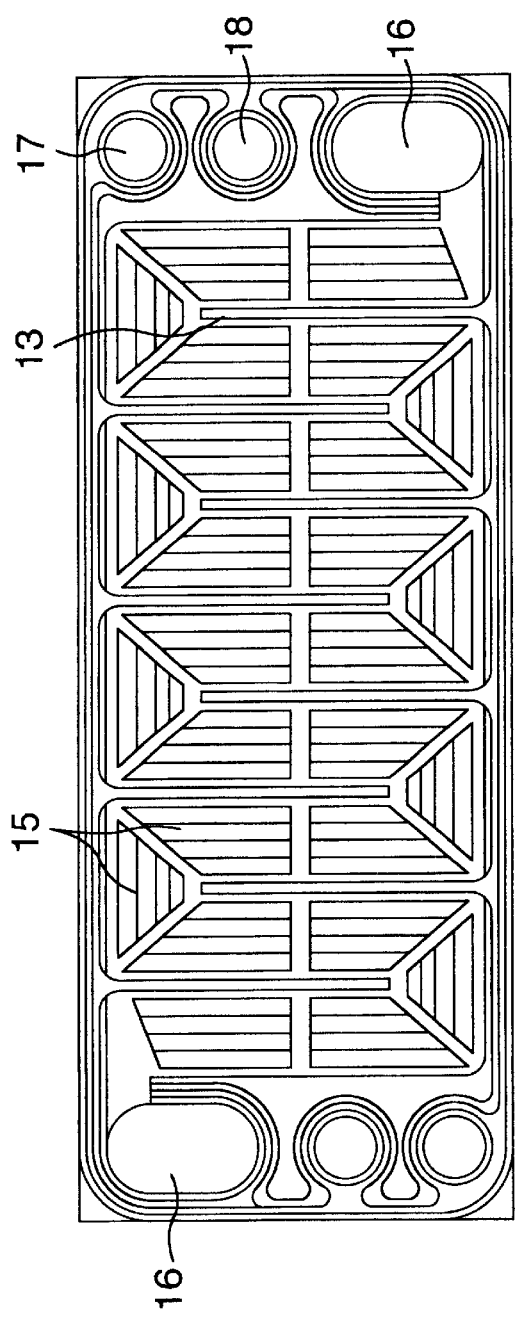
FIG. 2A is a schematic view of a fuel gas flow passage of a separator A in an embodiment in accordance with the present invention.
Figure 2B:
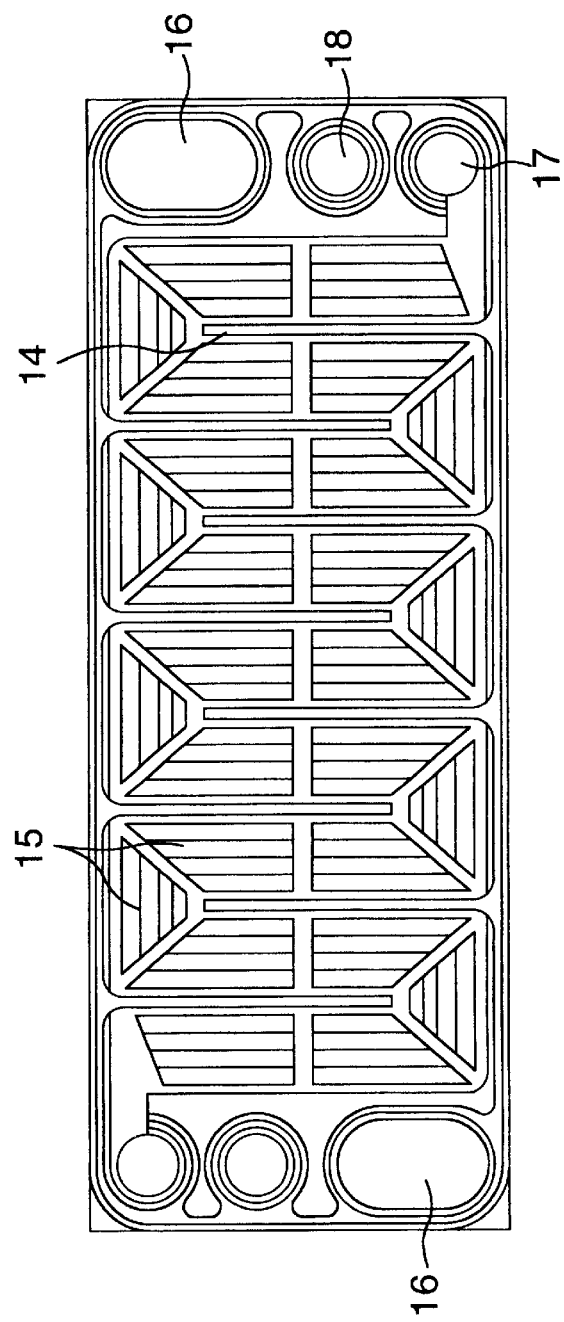
FIG. 2B is a schematic view of an oxidizing agent gas flow passage of the separator A in the embodiment in accordance with the present invention.

FIG. 2 is a schematic view of the separator A, in which FIG. 2A is a schematic view of the fuel gas flow passage integrally molded with the gasket on one surface of the separator and FIG. 2B is a schematic view of the oxidizing agent gas flow passage integrally molded on the other surface. A conductive corrugated plate 15 corresponding to a diffuser for complicating the flow passage is arranged between a fuel gas flow passage partition portion 13 and an oxidizing agent gas flow passage partition portion 14 which are integrally molded with the gasket and roughly constituted. Reference numeral 16 denotes a manifold through which a cathode (an air) flows, reference numeral 17 denotes a manifold through which an anode (hydrogen) flows, and reference numeral 18 denotes a manifold through which a cooling water flows.

Figure 3A:
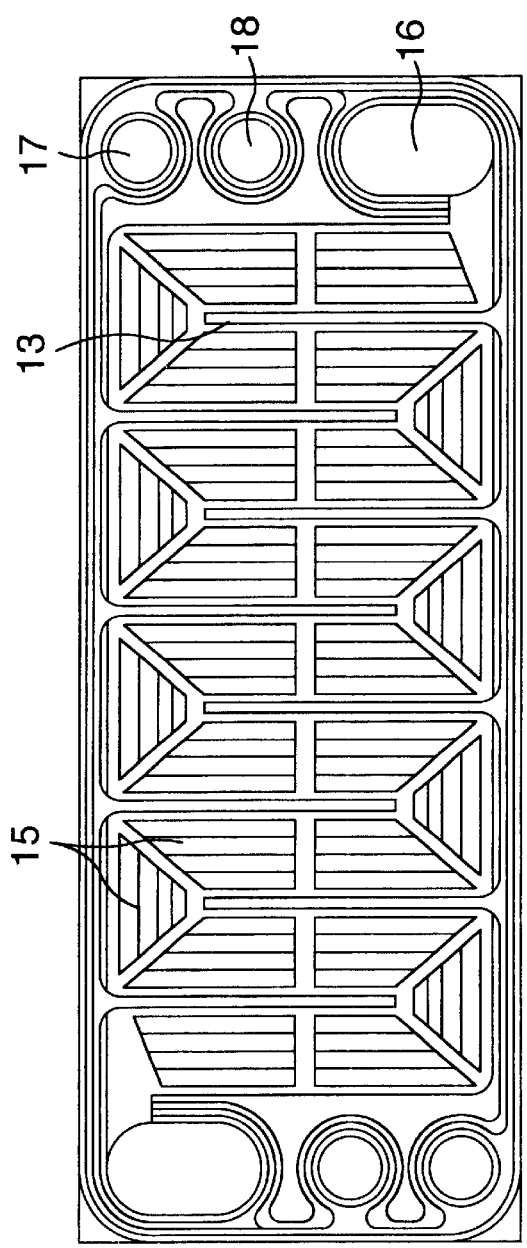
FIG. 3A is a schematic view of a fuel gas flow passage of a separator B in an embodiment in accordance with the present invention.
Figure 3B:
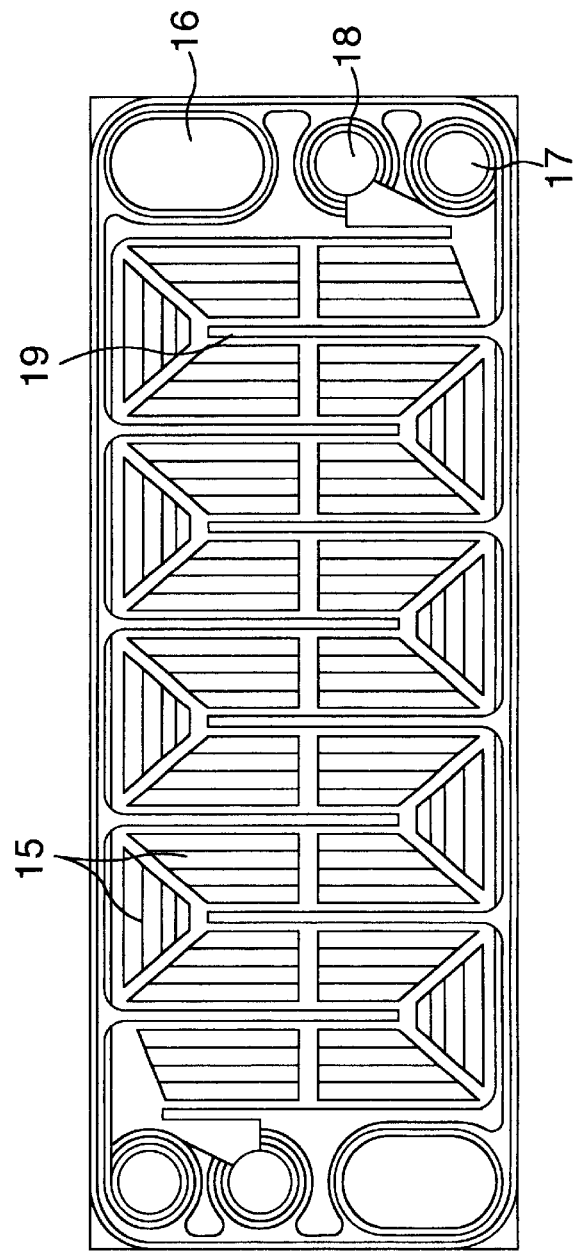
FIG. 3B is a schematic view of a cooling water flow passage of the separator B in the embodiment in accordance with the present invention.

FIG. 3 is a schematic view of the separator B, in which FIG. 3A is a schematic view of the fuel gas flow passage integrally molded with the gasket on one surface of the separator and FIG. 3B is a schematic view of the cooling water flow passage integrally molded on the other surface. The conductive corrugated plate 15 corresponding to a diffuser for complicating the flow passage is arranged between the fuel gas flow passage partition portion 13 and the cooling water flow passage partition portion 19 which are integrally molded with the gasket and roughly constituted. Reference numeral 16 denotes a manifold through which a cathode (an air) flows, reference numeral 17 denotes a manifold through which an anode (hydrogen) flows, and reference numeral 18 denotes a manifold through which a cooling water flows.

Figure 4A:
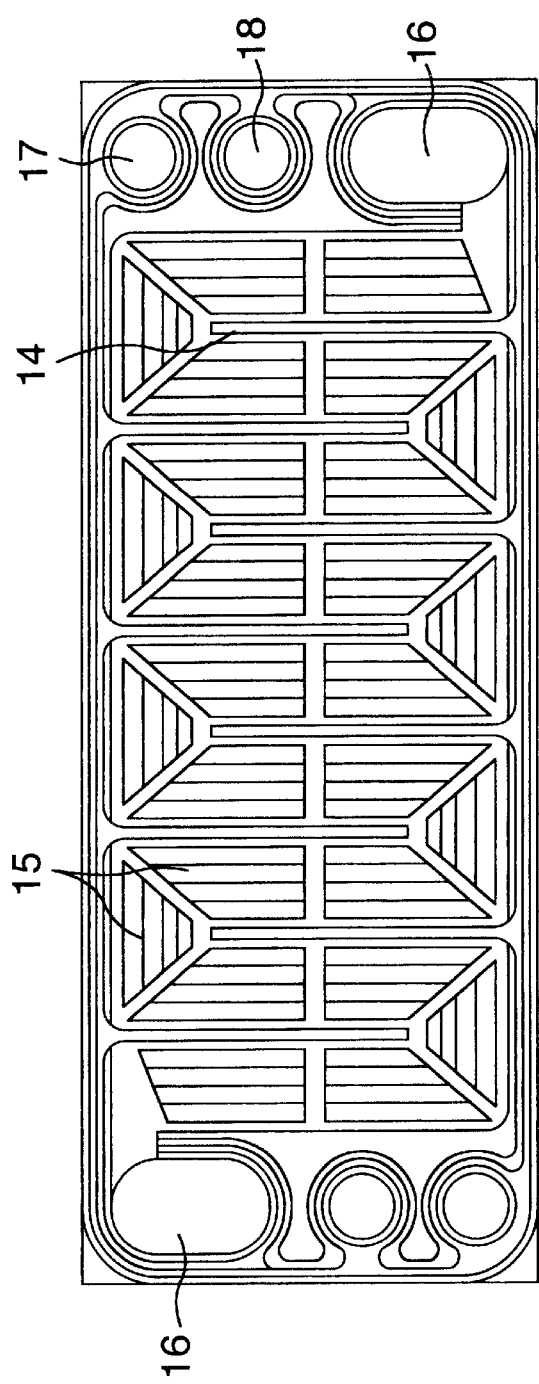
FIG. 4A is a schematic view of an oxidizing agent gas flow passage of a separator C in an embodiment in accordance with the present invention.
Figure 4B:
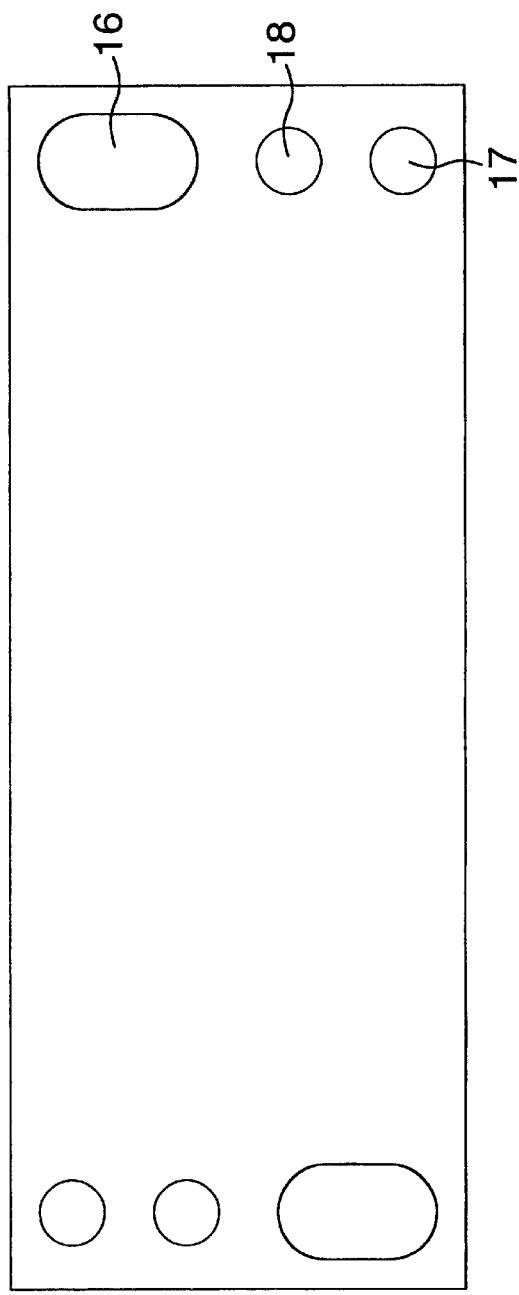
FIG. 4B is a view of a surface of the separator C in the embodiment in accordance with the present invention.

FIG. 4 is a schematic view of the separator C, in which FIG. 4A is a schematic view of the oxidizing agent gas flow passage integrally molded with the gasket on one surface of the separator and FIG. 4B is a schematic view of a surface on which no flow passage is formed. A conductive corrugated plate 15 corresponding to a diffuser for complicating the flow passage is arranged between the oxidizing agent gas flow passage partition portions 14 which are integrally molded with the gasket and roughly constituted. Reference numeral 16 denotes a manifold through which a cathode (an air) flows, reference numeral 17 denotes a manifold through which an anode (hydrogen) flows, and reference numeral 18 denotes a manifold through which a cooling water flows.

Figure 5A:
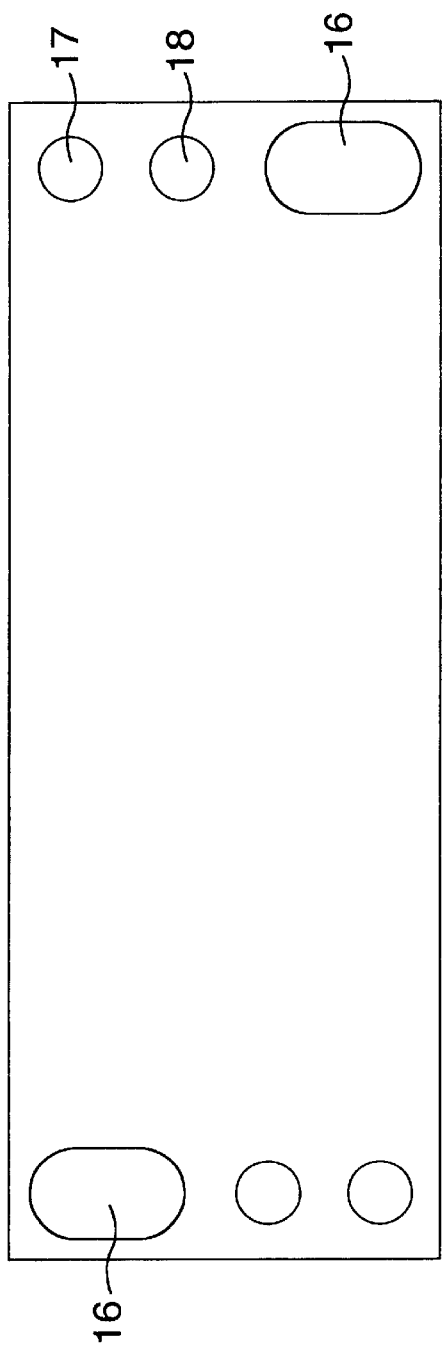
FIG. 5A is a view of a surface of a current collector A in an embodiment in accordance with the present invention.
Figure 5B:
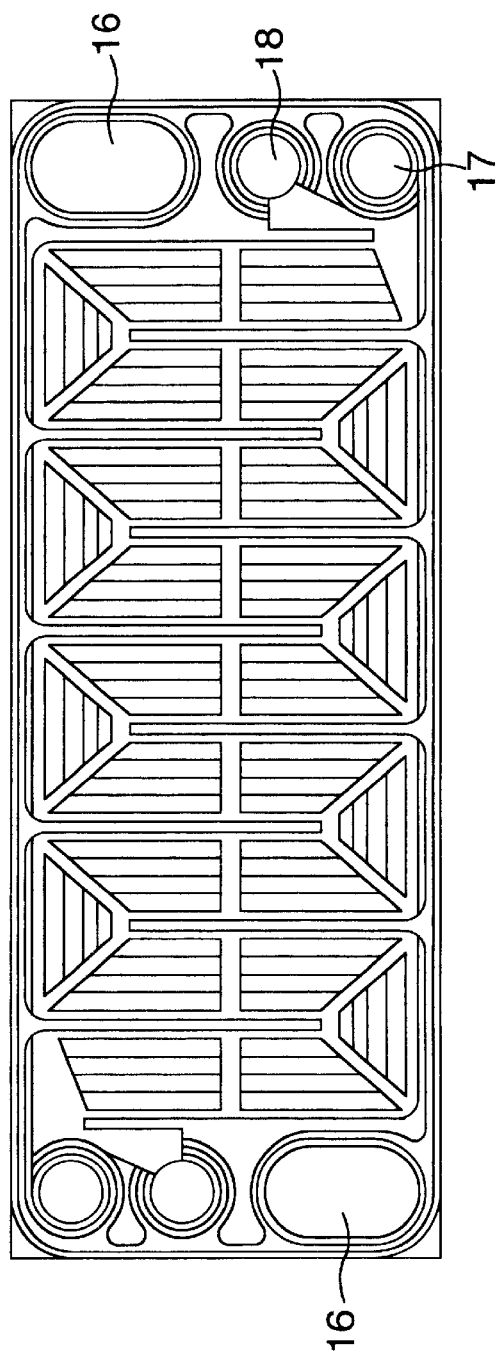
FIG. 5B is a schematic view of a cooling water flow passage of the current collector A in the embodiment in accordance with the present invention.
Figure 6:
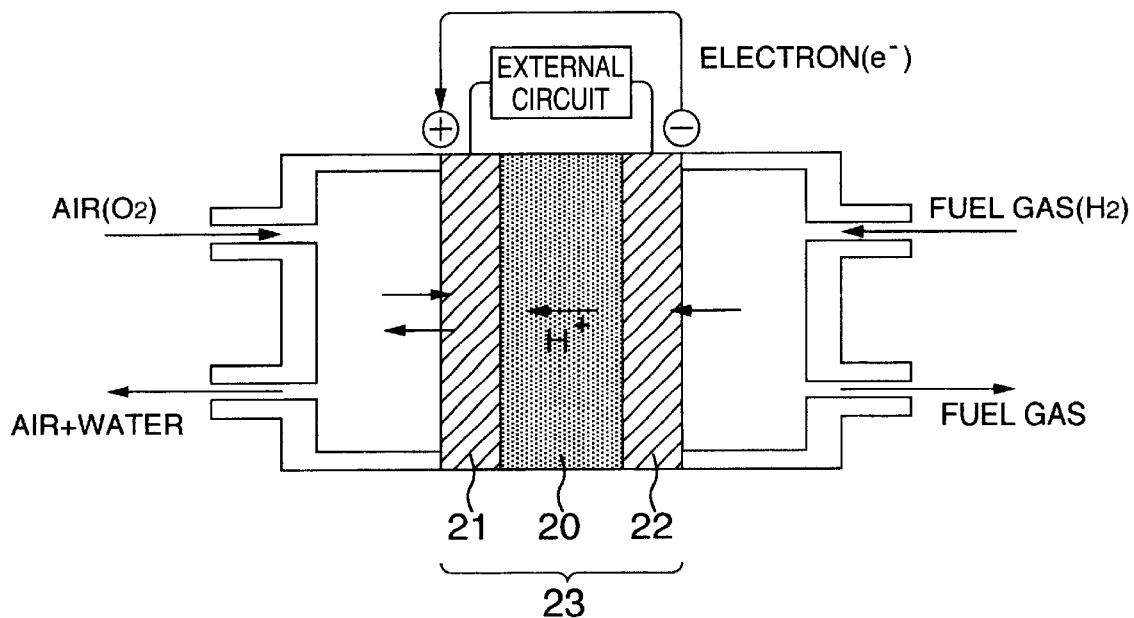
FIG. 6 is a schematic view which shows a principle of a fuel cells.
Figure 7:
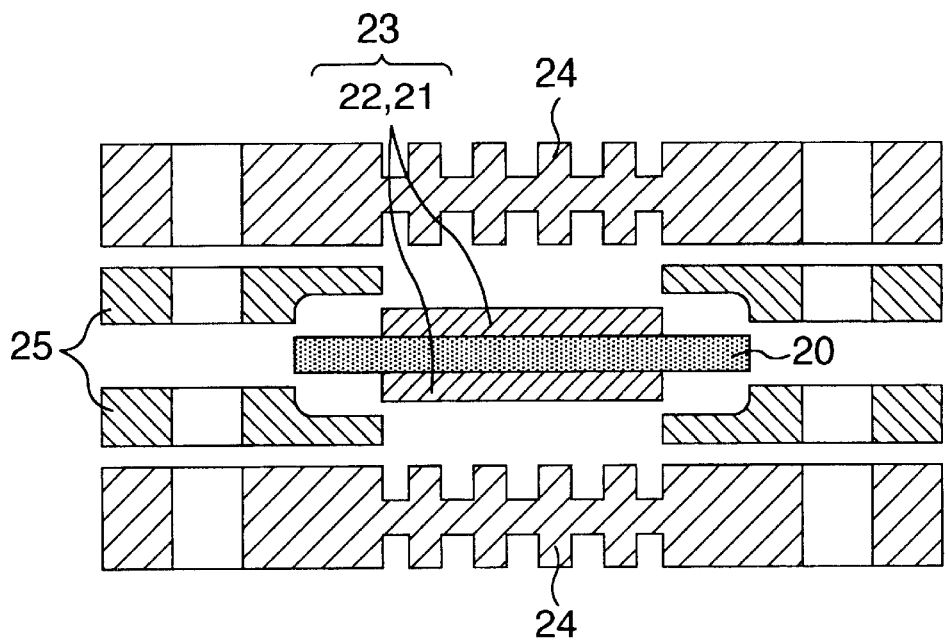
FIG. 7 is a schematic view of a flow passage in a conventional fuel cells separator.
Figure 8:
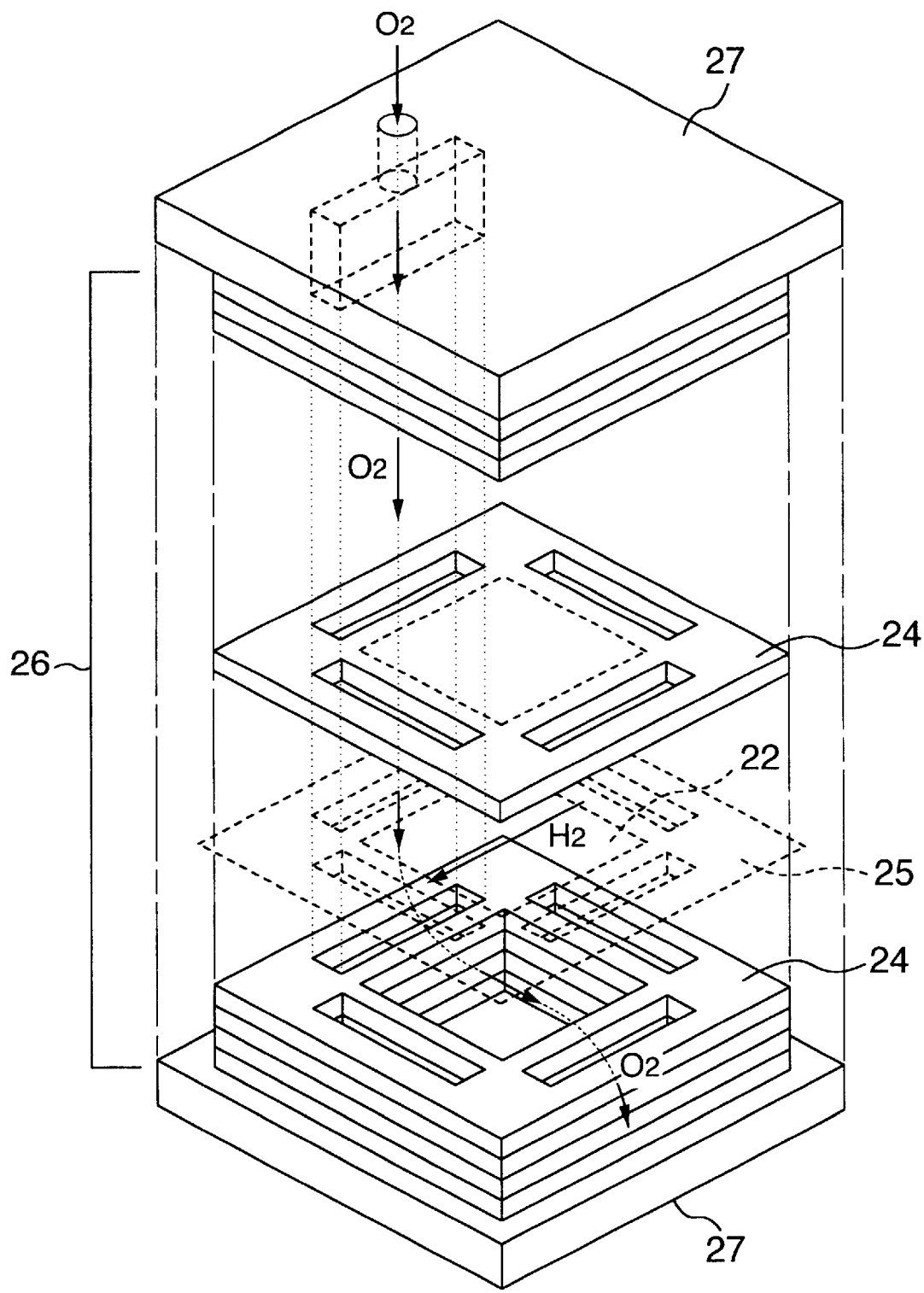
FIG. 8 is a schematic view of a conventional fuel cells stack.

FIG. 5 is a schematic view of the current collector A, in which FIG. 5A is a schematic view of a surface on which no flow passage is formed and FIG. 5B is a schematic view of the cooling water flow passage integrally molded on one surface of the current collector A with the gasket. The conductive corrugated plate 15 corresponding to a diffuser for complicating the flow passage is arranged between the cooling water flow passage partition portions 19 which are integrally molded with the gasket and roughly constituted. Reference numeral 16 denotes a manifold through which a cathode (an air) flows, reference numeral 17 denotes a manifold through which an anode (hydrogen) flows, and reference numeral 18 denotes a manifold through which a cooling water flows.

The gasket employed therein, and the fuel gas flow passage, the oxidizing agent gas flow passage and the cooling water flow passage which are integrally molded therewith are closely attached to a surface brought into contact with the respective flow passages at a time of fastening by the end plate so as to form a state of being sealed from an outer portion, and they are components of the fuel cell, so that a material having an elasticity, a sulfuric acid resistance and a heat resistance at about 100° C., for example, an ethylene propylene rubber (EPR) and a fluoro rubber is preferable. Further, a shape of each of the flow passages is not limited to the present embodiment, and may be formed in correspondence to an object such as a height, a width, an interval and the like.

Further, as a material for a gas permeable body made of a material having a conductivity as a diffuser, a metal, a carbon material, a conductive resin or the like is employed. A SUS, an aluminum, an iron or the like is preferably employed as the metal, an expansive graphite, a vitreous carbon, a glassy-like carbon or the like is preferably employed as the carbon material, and a phenol resin containing a graphite, a phenol resin containing a carbon fiber or the like is preferably employed as the conductive resin. Further, in order to improve a corrosion resistance and a conductivity, a material in which a surface treatment is applied by using a gold, a platinum, a carbon, a titan, a metal oxide, a metal nitride, a metal carbide or the like is preferable, and in the case of employing the metal as the gas permeable material, it is particularly preferable to apply a surface treatment. Further, as a shape of the gas permeable body, a corrugated shape, and a porous body such as a metal cellmate or the like are employed. Both of the separator and the gas permeable body can be manufactured at a low cost by employing a metal material, and they can be easily constructed by constructing them by means of welding.

In this case, in a shape of the diffuser and a method of arranging the diffuser between the respective flow passages, it is preferable to consider a combination with the respective flow passages so that the gas and the cooling water efficiently flows, and accordingly they are not limited to the present embodiment. Further, at a time of arranging the diffuser, a treating performance of the separator can be improved by connecting the diffuser to the separator by a welding means such as a spot welding or the like, and accordingly, it is preferable.

Further, the fuel cells stack in accordance with the present invention is not limited to the structure shown in FIG. 1, and a number of the lamination of each of the parts, a laminating order and the like can be modified in a desired manner.

In accordance with the present invention, a cutting operation is not required by constructing the fuel gas flow passage, the oxidizing agent gas flow passage and the cooling water flow passage by a combination of the diffuser and the elastic gasket which are constituted by the conductive porous body or the corrugated plate, and the number of the parts can be reduced and an operating performance can be improved by integrally forming the gasket, so that a cost can be reduced.

What is claimed is:

1. A fuel cells stack comprising:
    a plurality of fuel cells each arranging an electrode on both sides of a solid electrolyte,
    separators, each including a gas impermeable and dense plate having a conductivity and gaskets, laminated to form a plurality of layers,
    current collectors gripping both ends of said fuel cells stack,
    a fuel gas flow passage for supplying a fuel gas to the fuel cell provided on one side surface of the fuel cell, and an oxidizing agent gas flow passage for supplying an oxidizing agent gas to the fuel cell provided on the other side surface of the fuel cell, wherein:
    any one of said fuel gas flow passage, said oxidizing agent gas flow passage and a cooling water flow passage used for cooling said fuel cell is provided on a side surface of at least one of said fuel cell and the laminated separator, and the fuel gas flow passage, the oxidizing agent gas flow passage and the cooling water flow passage provided in said separator are constituted by a combination of the gasket formed in a one-piece configuration with the separator and a diffuser formed in a one-piece configuration with the separator and comprising a gas permeable body made of a material having a conductivity, said gasket and said diffuser form a pattern of at least one of said fuel gas flow passage, said oxidizing agent gas flow passage and said cooling water flow passage, and said diffuser seals a gap in at least one of said fuel gas flow passage, said oxidizing agent gas flow passage and said cooling water flow passage.

2. A fuel cells stack as claimed in claim 1, wherein the diffuser comprises one of a porous body and a corrugated plate.

3. A fuel cells stack as claimed in claim 2, wherein the gas permeable body made of a material having a conductivity is surface coated by a conductive material having a corrosion resistance.

4. A fuel cells stack as claimed in claim 3, wherein the conductive material having a corrosion resistance contains at least one member selected from a group comprising a gold, a platinum, a carbon, a titanium, a metal oxide, a metal nitride and a metal carbide.

5. A fuel cells stack as claimed in claim 2, wherein the gas permeable body is surface coated by a conductive material having a corrosion resistance, the conductive material containing at least one member selected from a group comprising a gold, a platinum, a carbon, a titanium, a metal oxide, a metal nitride and a metal carbide.

6. A fuel cells stack as claimed in claim 1, wherein the gas permeable body made of a material having a conductivity comprises a metal, a carbon material or a conductive resin.

7. A fuel cells stack as claimed in claim 6, wherein the permeable body made of a material having a conductivity is surface coated by a conductive material having a corrosion resistance.

8. A fuel cells stack as claimed in claim 7, wherein the conductive material having a corrosion resistance contains at least one member selected from a group comprising a gold, a platinum, a carbon, a titanium, a metal oxide, a metal nitride and a metal carbide.

9. A fuel cells stack as claimed in claim 6, wherein the gas permeable body is surface coated by a conductive material having a corrosion resistance, the conductive material containing at least one member selected from a group comprising a gold, a platinum, a carbon, a titanium, a metal oxide, a metal nitride and a metal carbide.

10. A fuel cells stack as claimed in claim 1, wherein the separator and the gas permeable body made of a material having a conductivity comprise a metal.

11. A fuel cells stack as claimed in claim 10, wherein the gas permeable body made of a material having a conductivity is surface coated by a conductive material having a corrosion resistance.

12. A fuel cells stack as claimed in claim 11, wherein the conductive material having a corrosion resistance contains at least one member selected from a group comprising a gold, a platinum, a carbon, a titanium, a metal oxide, a metal nitride and a metal carbide.

13. A fuel cells stack as claimed in claim 10, wherein the gas permeable body is surface coated by a conductive material having a corrosion resistance, the conductive material containing at least one member selected from a group comprising a gold, a platinum, a carbon, a titanium, a metal oxide, a metal nitride and a metal carbide.

14. A fuel cells stack as claimed in claim 1, wherein the separator and the gas permeable body made of a material having conductivity are constructed by welding.

15. A fuel cells stack as claimed in claim 14, wherein the gas permeable body made of a material having a conductivity is surface coated by a conductive material having a corrosion resistance.

16. A fuel cells stack as claimed in claim 15, wherein the conductive material having a corrosion resistance contains at least one member selected from a group comprising a gold, a platinum, a carbon, a titanium, a metal oxide, a metal nitride and a metal carbide.

17. A fuel cells stack as claimed in claim 14, wherein the conductive material having a corrosion resistance contains at least one member selected from a group comprising a gold, a platinum, a carbon, a titanium, a metal oxide, a metal nitride and a metal carbide.

18. A fuel cells stack as claimed in claim 1, wherein the gas permeable body made of a material having a conductivity is surface coated by a conductive material having a corrosion resistance.

19. A fuel cells stack as claimed in claim 18, wherein the conductive material having a corrosion resistance contains at least one member selected from a group comprising a gold, a platinum, a carbon, a titanium, a metal oxide, a metal nitride and a metal carbide.

20. A fuel cells stack as claimed in claim 1, wherein the gas permeable body is surface coated by a conductive material having a corrosion resistance, the conductive material including at least one member comprising gold, a platinum, a carbon, a titanium, a metal oxide, a metal nitride and a metal carbide.

* * * * *